April 28, 1925.
W. T. SEARS
1,535,258
DRILLING MACHINE
Original Filed Sept. 9, 1921
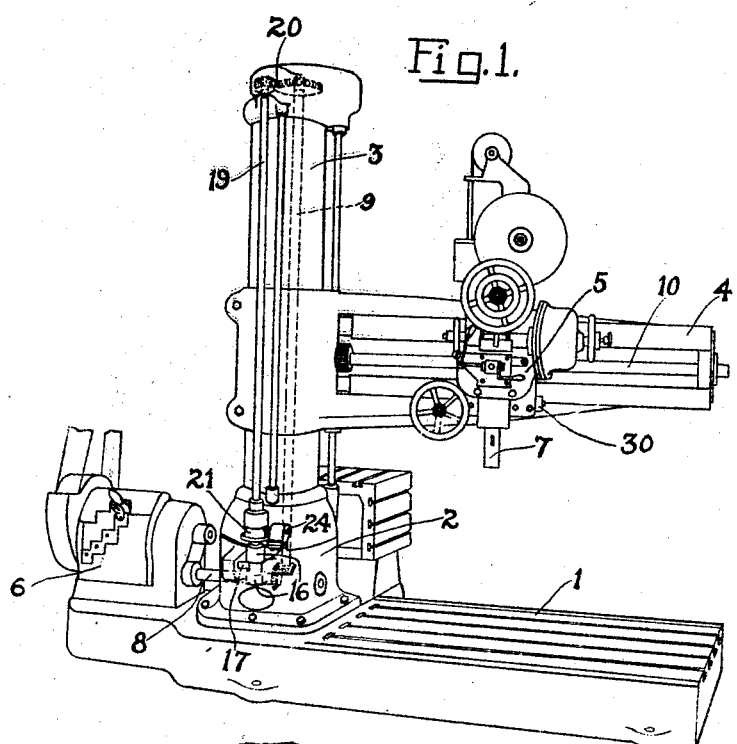
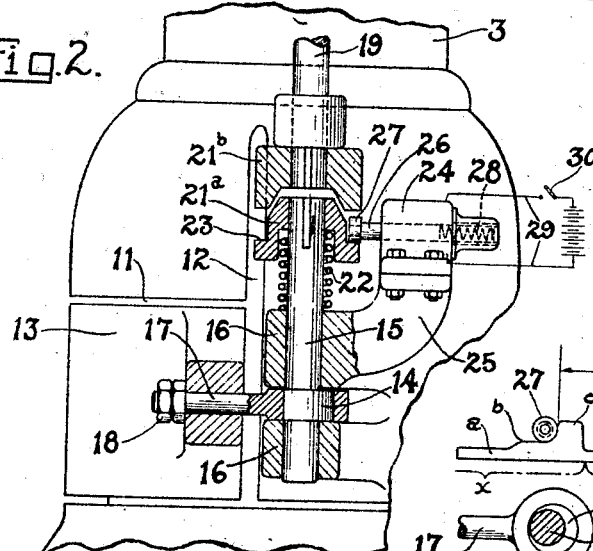
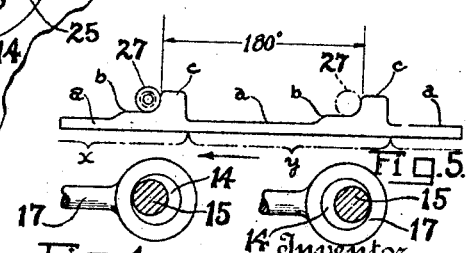
Inventor
W. T. Sears
By Lawrence S. Witter
Attorney Patented Apr. 28, 1925.

1,535,258

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

DRILLING MACHINE.

Application filed September 9, 1921, Serial No. 499,522. Renewed February 23, 1923.

*To all whom it may concern:*

Be it known that I, WILLARD T. SEARS, a citizen of the United States, residing at Montclair, in the county of Essex and State of New Jersey, have invented certain new and useful Improvements in Drilling Machines, of which the following is a specification.

This invention relates to drilling machines and particularly to an improved drill column clamping mechanism broadly of the type defined in my copending application Serial No. 499,521 filed on even date herewith. In the present invention, however, a clamping mechanism including a clamping shaft operated in a single direction from the main power means is provided, a clutch, preferably of the friction type, being used for operatively connecting the column clamping mechanism with the main power means for performing the clamping operation. It is the primary object of the invention to provide a drill column clamping mechanism of the type stated wherein the clamping means clamps and unclamps the column by intermittent rotary movements of the clamping shaft in the same direction, as a clutch and its controlling mechanism, being provided for controlling these movements as desired.

A further object of the invention is to provide a clamping mechanism of the above type wherein a friction clutch is controlled by electro-magnetic means in a manner to quickly and conveniently clamp the column at the will of the operator.

With these and other objects in view my invention consists in the features of construction and operation set forth in the following specification and illustrated in the accompanying drawing. In such drawing annexed hereto and forming a part of this specification, I have shown my invention as embodied in one type of radial drilling machine, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a perspective view of a radial drilling machine embodying my invention.

Fig. 2 is an enlarged fragmentary sectional view of the clamping mechanism.

Fig. 3 is a diagrammatic view of a cam path on the clutch to be hereinafter described.

Figs. 4 and 5 are fragmentary detail views illustrating the clamping mechanism in the clamped and unclamped positions respectively.

Referring more specifically to the drawing by reference characters, 1 indicates the bed of a radial drilling machine on the base 2 of which is mounted for rotary adjustment a drill supporting column 3. An arm 4 is illustrated as mounted for vertical movement on the column and a drill supporting element 5 is mounted for horizontal movement along the arm. A main power means 6 is provided for operating the drilling mechanism, including the rotation of the drill spindle 7. The driving connection from the power means to the drill spindle comprises the usual driving elements, including the power shaft 8, a vertical shaft 9 within the column and an arm shaft 10, the usual gearing being provided for operatively connecting these several shafts and the drill spindle. The mechanism thus far described, within itself, comprises no part of the present invention and therefore will not be further described herein. The novel mechanism comprising the invention will now be described in detail.

As heretofore stated, the drill column 3 is adapted to be adjustably rotated about its vertical axis to permit the swinging adjustment of the drill supporting arm 4. The base 2 is slotted at 11 and 12 to provide a movable clamping portion 13 for gripping the column to secure the same against rotation while performing drilling operations. I have illustrated this clamping portion as provided with a clamping mechanism including an eccentric 14 on a shaft 15 rotatably mounted in two lugs 16 on the base. An element 17 engages the eccentric and connects the lugs 16 to the clamping portion 13. Check nuts 18 are provided on the element 17 for adjusting the same. Rotation of the eccentric is adapted to clamp and unclamp the column.

In the drawing, I have illustrated mechanism for rotating the eccentric in a single direction from the main power means to effect the clamping and unclamping of the column. While the connecting means between the main power and the clamping mechanism is illustrated as a friction clutch, it will be readily understood that the scope of my invention comprises the use of any other convenient means for performing the same function.

A vertical shaft 19 is illustrated as being driven from the column shaft 9 through gears 20. The clamping shaft 15 is adapted to be rotated from the shaft 19 for effecting the clamping of the column through the following mechanism, such mechanism being illustrated in detail in Fig. 2. The shafts 15 and 19 are coaxial and are provided at their adjacent ends with the cooperating parts 21$^a$ and 21$^b$ of a friction clutch 21. The portion 21$^b$ of the clutch is keyed to the lower end of shaft 19, and the portion 21$^a$ is splined for sliding movement on the upper end of shaft 15, a spring 22 serving to normally hold the clutch portion 21$^a$ in driving engagement with portion 21$^b$.

The clutch portion 21$^a$ is provided with a cam path 23 therearound, the entire contour of this path being diagrammatically shown in Fig. 3. A solenoid 24 is mounted on a bracket 25 adjacent the clutch. A longitudinally sliding core 26 in the solenoid is provided with a roller 27 at one end adapted to ride on the cam path, a spring 28 at the other end normally forcing the core and roller toward the clutch. The cam path is formed with two symmetrical halves $x$ and $y$ (Fig. 3), each half comprising a low portion $a$, a raised portion $b$, and a shoulder $c$. With the roller 27 over the low portion $a$, the clutch portion 21$^a$ will be held in driving engagement with the clutch portion 21$^b$ by spring 22. With the roller over the raised portion $b$, the clutch will be held disengaged as illustrated in Figs. 2 and 3. The solenoid may be energized through a pair of terminals 29 adapted to be closed by a switch 30, this switch preferably being a push button on the drill supporting element 5 as illustrated.

The operation of the mechanism is as follows: With the column in the clamped position illustrated in Figs. 2, 3 and 4, the column is secured against rotation on its base. To unclamp the column the operator pushes the button 30 whereupon the solenoid is energized and the core and roller 27 drawn from engagement with the cam path 23. The spring 22 then engages the clutch portion 21$^a$ with the portion 21$^b$ whereby the clamping shaft 15 and eccentric 14 thereon are rotated (in the direction of the arrow, Fig. 3) from the shaft 19. As soon as the core 26 has been withdrawn sufficiently to disengage the roller from the cam path, the operator releases the button 30 whereupon the spring 28 forces the core and roller toward the clutch. When the shoulder $c$ has passed the roller, the roller enters the clutch between the clutch portion 21$^b$ and the portion $a$ of the cam path and the shaft 15 continues its rotation until the raised portion $b$ rides beneath the roller and withdraws the portion 21$^a$ of the clutch from the portion 21$^b$. The rotation of the shaft 15 is stopped and the eccentric held in the unclamping position by the roller engaging and resting against the shoulder $c$ shown at the right of Fig. 3. To clamp the column, the operator again pushes the button 30 whereupon the shaft 15 is rotated 180° in the same manner as heretofore described, the roller, however, coming against the shoulder $c$ shown at the left of Fig. 3. The detail views of the eccentrics shown in Figs. 4 and 5 indicate respectively the clamping and unclamping positions of the eccentric corresponding to the adjacent positions of the shoulders $c$ relative to the roller 28 as shown in Fig. 3.

What I claim is:

1. In a drilling machine, the combination of a base, a column rotatably supported on the base, drilling mechanism carried by the column, power means for operating the drilling mechanism, clamping means for engaging the column adjacent the base, and means comprising a friction clutch for operatively connecting the clamping means with the power means for effecting the clamping of the column through the clamping means.

2. In a drilling machine, the combination of a base, a column rotatably supported on the base, drilling mechanism carried by the column, power means for operating the drilling mechanism, clamping means for engaging the column adjacent the base, means comprising a friction clutch for operatively connecting the clamping means with the power means for effecting the clamping of the column through the clamping means, means for closing the clutch, and means for opening and holding the clutch open with the clamping means either in the clamped or unclamped position.

3. In a drilling machine, the combination of a base, a column rotatably supported on the base, drilling mechanism carried by the column, power means for operating the drilling mechanism, clamping means surrounding the column adjacent the base, a clutch for operatively connecting the clamping means with the power means for effecting the clamping of the column through the clamping means, a spring for normally closing the clutch, and means under the control of the operator for automatically opening the clutch against the action of the spring in a manner leaving the clamping means either in the column clamping or unclamping position.

4. In a drilling machine, the combination of a base, a column rotatably supported on the base, drilling mechanism carried by the column, power means for operating the drilling mechanism, clamping means for engaging the column adjacent the base, means comprising a clutch for operatively connecting the clamping means with the power means for effecting the clamping of the column through the clamping means, a spring for normally closing the clutch, the clutch being provided with a path extending therearound and having a shoulder thereon, and means riding on the path and adapted to engage the shoulder to disengage the clutch against the action of the spring when the clamping mechanism has been moved to the desired position.

5. In a drilling machine, the combination of a base, a column rotatably supported on the base, drilling mechanism carried by the column, power means for operating the drilling mechanism, clamping means for engaging the column adjacent the base, a shaft operatively connected with the clamping means, a clutch for operatively connecting the shaft with the power means for effecting the clamping of the column through the clamping means, means for closing the clutch, the clutch being provided with a path extending therearound and having a pair of shoulders thereon, and means riding on the path and adapted to engage the shoulders to stop the rotation of the shaft with the clamping means in the clamped and unclamped positions respectively.

6. In a drilling machine, the combination of a base, a column rotatably supported on the base, drilling mechanism carried by the column, power means for operating the drilling mechanism, clamping means surrounding the column adjacent the base, a shaft operatively connected with the clamping means for operating the same, rotation of the shaft in a single direction being adapted to clamp and unclamp the column, and means under the control of the operator for operatively connecting the power means with the said shaft to intermittently rotate the shaft in the same direction and to alternately clamp and unclamp the column.

7. In a drilling machine, the combination of a base, a column rotatably supported on the base, drilling mechanism carried by the column, power means for operating the drilling mechanism, clamping means surrounding the column adjacent the base, a shaft operatively connected with the clamping means for operating the same, rotation of the shaft in a single direction being adapted to clamp and unclamp the column, means under the control of the operator for operatively connecting the power means with the said shaft to intermittently rotate the shaft in the same direction and to alternately clamp and unclamp the column, and stop means for alternately stopping the rotation of the shaft in the clamping and unclamping positions respectively.

8. In a drilling machine, the combination of a base, a column rotatably supported on the base, drilling mechanism carried by the column, power means for operating the drilling mechanism, clamping means for engaging the column adjacent the base, a clutch for operatively connecting the clamping means with the power means for effecting the clamping of the column through the clamping means, and a switch comprising a single electric circuit for controlling the clutch to clamp and unclamp the column.

9. In a drilling machine, the combination of a base, a column rotatably supported on the base, drilling mechanism carried by the column, power means for operating the drilling mechanism, clamping means for engaging the column adjacent the base, a clutch always rotatable in the same direction from the power means and adapted to operatively connect the clamping means with the power means for effecting clamping of the column through the clamping means, and means comprising an electric switch for controlling the clutch to clamp and unclamp the column, the intermittent closing of the switch being adapted to alternately clamp and unclamp the column.

10. In a drilling machine, the combination of a base, a column rotatably supported on the base, an arm carried by the column, a drill supporting element on the arm, power means for operating the drill, clamping means for engaging the column adjacent the base, means comprising a friction clutch for operatively connecting the clamping means with the power means for effecting the clamping of the column through the clamping means, and means comprising a hand operated device on the drill supporting element for controlling the clamping operation through the friction clutch.

11. In a drilling machine, the combination of a base, a column rotatably supported on the base, drilling mechanism carried by the column, power means for operating the drilling mechanism, clamping means for engaging the column adjacent the base, means comprising a friction clutch for operatively connecting the clamping means with the power means for effecting the clamping of the column through the clamping means, and electro-magnetic means for controlling the clutch.

12. In a drilling machine, the combination of a base, a column rotatably supported on the base, an arm carried by the column, a drill supporting element on the arm, power means for operating the drill, clamping means for engaging the column adjacent the base, means comprising a friction clutch for operatively connecting the clamping means with the power means for effecting the clamping of the column through the clamping means, electro-magnetic means for controlling the clutch, and a switch on the drill supporting element for controlling the electro-magnetic means.

In testimony whereof, I hereto affix my signature.

WILLARD T. SEARS.